United States Patent [19]
Fischer et al.

[11] Patent Number: 5,786,436
[45] Date of Patent: Jul. 28, 1998

[54] METHODS OF PREPARING INORGANIC PIGMENT DISPERSIONS

[75] Inventors: Stephen A. Fischer, Yardley; Michael S. Wiggins, Lansdale; Bruce Matta, Emmaus, all of Pa.

[73] Assignee: Henkel Corporation, Plymouth Meeting, Pa.

[21] Appl. No.: 893,445

[22] Filed: Jul. 11, 1997

Related U.S. Application Data

[63] Continuation of Ser. No. 670,965, Jun. 26, 1996, abandoned.

[60] Provisional application No. 60/011,754 Jun. 26, 1995.

[51] Int. Cl.$^6$ ........................................... C08F 226/02
[52] U.S. Cl. ........................................ 526/307.6; 526/215
[58] Field of Search ............................. 526/307.6, 215

[56] References Cited

U.S. PATENT DOCUMENTS

| | | | |
|---|---|---|---|
| 2,772,252 | 11/1956 | Briskin et al. | 260/80.5 |
| 2,795,564 | 6/1957 | Conn et al. | 260/29.6 |
| 2,875,166 | 2/1959 | Hopkins | 260/29.6 |
| 3,035,004 | 5/1962 | Glavis | 260/29.7 |
| 3,037,952 | 6/1962 | Jordan, Jr. et al. | 260/29.6 |
| 3,356,627 | 12/1967 | Scott | 260/29.6 |
| 3,703,567 | 11/1972 | Sutter et al. | 260/880 |
| 3,980,602 | 9/1976 | Jakubauskas | 260/29.6 |
| 4,025,483 | 5/1977 | Ramig, Jr. | 260/29.6 |
| 4,098,987 | 7/1978 | Barua et al. | 526/304 |
| 4,129,472 | 12/1978 | Hobes et al. | 526/307.6 |
| 4,200,713 | 4/1980 | Wingler et al. | 526/64 |
| 4,243,430 | 1/1981 | Sperry et al. | 106/308 |
| 4,244,863 | 1/1981 | Hemmerich et al. | 260/42.55 |
| 4,283,320 | 8/1981 | Carroll et al. | 260/29.6 |
| 4,410,673 | 10/1983 | Schulz et al. | 526/202 |
| 4,514,540 | 4/1985 | Peck | 524/514 |
| 4,628,071 | 12/1986 | Morgan | 524/832 |
| 4,677,174 | 6/1987 | Alexander et al. | 526/240 |
| 4,948,847 | 8/1990 | Morita et al. | 526/64 |
| 4,954,562 | 9/1990 | Anderson | 524/779 |
| 5,138,004 | 8/1992 | dePierne et al. | 526/293 |
| 5,160,370 | 11/1992 | Suga | 106/20 |
| 5,229,472 | 7/1993 | Binsbergen et al. | 526/64 |
| 5,268,437 | 12/1993 | Holy et al. | 526/229 |
| 5,270,412 | 12/1993 | Rauterkus et al. | 526/258 |
| 5,473,031 | 12/1995 | Tinetti et al. | 526/307.6 |

FOREIGN PATENT DOCUMENTS 737728  10/1996  European Pat. Off. .

OTHER PUBLICATIONS

"Styrene Polymers" *Encyclopedia of Polymer Science and Engineering*, vol. 16, pp. 1–21 (John Wiley & Sons, Inc., N.Y., N.Y., 1989).

"Acrylic and Methacrylic Acid Polymers", *Encyclopedia of Polymer Science and Engineering*, vol. 1, pp. 211–234 (John Wiley & Sons, Inc., N.Y., N.Y., 1985).

"Chain Transfer," *Encyclopedia of Polymer Science and Engineering*, vol. 3, pp. 288–290 (John Wiley & Sons, Inc., N.Y., N.Y., 1985).

"Latices", *Encyclopedia of Polymer Science and Engineering*, vol. 8, pp. 647–677 (John Wiley & Sons, Inc., N.Y., N.Y., 1987).

"Coatings", *Encyclopedia of Polymer Science and Engineering*, vol. 3, pp. 615–675 (John Wiley & Sons, N.Y., N.Y., 1985).

"Coating Methods," *Encyclopedia of Polymer Science and Engineering*, vol. 3, pp. 552–575 (John Wiley & Sons, N.Y., N.Y., 1985).

"Tamol® 165A (Jan. 1994)", Tamol® 731A (Jul. 1995), *Rohm and Haas Company*.

*Primary Examiner*—Joseph L. Schofer
*Assistant Examiner*—N. Sarofim
*Attorney, Agent, or Firm*—Ernest G. Szoke; Wayne C. Jaeschke; Martin G. Meder

[57] ABSTRACT

A polymer useful as an inorganic pigment dispersant is provided. The polymer is derived from monomers consisting essentially of an ethylenically unsaturated aromatic monomer, an ethylenically unsaturated acid monomer, and an ethylenically unsaturated amide monomer. The amount of said ethylenically unsaturated acid monomer is sufficient to permit said polymer to associate with an inorganic pigment in an aqueous medium in a manner which disperses said inorganic pigment in said aqueous medium to form a stable aqueous dispersion of said inorganic pigment, and the amount of said ethylenically unsaturated aromatic monomer is sufficient to reduce the water sensitivity of a dried coating of a latex paint comprised of said stable aqueous dispersion of said inorganic pigment. A process of preparing a polymer useful as an inorganic pigment dispersant and a method of preparing an inorganic pigment dispersion useful in the preparation of latex paints are also provided.

57 Claims, No Drawings

METHODS OF PREPARING INORGANIC PIGMENT DISPERSIONS

CROSS-REFERENCE TO RELATED APPLICATIONS

This application is a continuation of application Ser. No. 08/670,965 filed on Jun. 26, 1996 now abandoned.

This application claims priority from U.S. provisional application Ser. No. 60/011,754, filed Jun. 26, 1995, the disclosure of which provisional application is incorporated herein by reference and patent application Ser. No. 08/494,456 of the same filing date, now abandoned.

FIELD OF THE INVENTION

The present invention relates to polymers useful in preparing inorganic pigment dispersions and methods of preparing such polymers, methods of preparing inorganic pigment dispersions useful in the manufacture of latex paints, and latex paints prepared therewith.

BACKGROUND OF THE INVENTION

Paint coatings are protective surface coatings applied to substrates and cured to form dry continuous films for decorative purposes as well as to protect the substrate. Consumer latex paint coatings are air-drying aqueous coatings applied primarily to architectural interior or exterior surfaces, where the coatings are sufficiently fluid to flow out, form a continuous paint film, and then dry at ambient temperatures to form continuous films.

A paint coating is ordinarily comprised of an organic polymeric binder, pigments, and various paint additives. The polymeric binder acts as a fluid vehicle for the pigments and imparts rheological properties to the fluid paint coating. In dried paint films, the polymeric binder functions as a binder for the pigments and provides adhesion of the dried paint film to the substrate. The pigments may be organic or inorganic and functionally contribute to opacity and color in addition to durability and hardness.

The manufacture of paint coatings involves the preparation of a polymeric binder, mixing of component materials, grinding of pigment in the presence of a pigment dispersant, mixing the pigment grind with the polymeric binder, and thinning to commercial standards. High speed dispersers or dissolvers are used in the grinding step to disperse the pigments into the polymeric binder solution.

Considerable research effort has been directed toward eliminating volatile organic compounds (VOC) from consumer paints and especially from latex paints to eliminate emission problems as well as the odor problems. (VOC is a measure of volatile organic compounds in a paint composition according to U.S. EPA Rule 24. See also ASTM Manual Series MNL4 and ASTM D-3960 and ASTM D-2369-87.) Thus, an urgent need exists to eliminate consumer VOC problems with air drying paints.

Polyacrylic acid in its neutralized form has been used to prepare aqueous pigment dispersions, particularly dispersions of titanium dioxide. Polyacrylic acid disperses the pigment well and contributes little, if at all, to the VOC of the latex paint into which the pigment dispersion is incorporated. However, polyacrylic acid also tends to contribute to water sensitivity of the dried paint coating. For example, an exterior paint coating is more susceptible to water damage as a result of precipitation and an interior paint coating may be damaged when scrubbed with aqueous liquids, e.g. soap and water. A pigment dispersant with a reduced contribution to the water sensitivity of the dried paint coating is therefore desirable.

SUMMARY OF THE INVENTION

This invention relates to a polymer useful as an inorganic pigment dispersant, said polymer being derived from monomers consisting essentially of an ethylenically unsaturated aromatic monomer, an ethylenically unsaturated acid monomer, and an ethylenically unsaturated amide monomer, wherein the amount of said ethylenically unsaturated acid monomer is sufficient to permit said polymer to associate with an inorganic pigment in an aqueous medium in a manner which disperses said inorganic pigment in said aqueous medium to form a stable aqueous dispersion of said inorganic pigment, and wherein the amount of said ethylenically unsaturated aromatic monomer is sufficient to reduce the water sensitivity of a dried coating of a latex paint comprised of said stable aqueous dispersion of said inorganic pigment.

This invention also relates to a process of preparing a polymer useful as an inorganic pigment dispersant, said process comprising dissolving monomers consisting essentially of an ethylenically unsaturated aromatic monomer, an ethylenically unsaturated acid monomer, and an ethylenically unsaturated amide monomer in a solvent consisting essentially of a major amount by weight of a water-miscible organic solvent having chain transfer activity and a minor amount by weight of water and polymerizing said monomers in said solution.

This invention also relates to a method of preparing an inorganic pigment dispersion useful in the preparation of latex paints, said method comprising dispersing an inorganic pigment in an aqueous medium further comprised of a dispersing polymer, said aqueous medium being essentially free of volatile organic solvents, and said dispersing polymer being derived from monomers consisting essentially of an ethylenically unsaturated aromatic monomer, an ethylenically unsaturated acid monomer, and an ethylenically unsaturated amide monomer, wherein the amount of said ethylenically unsaturated acid monomer is sufficient to permit said polymer to associate with an inorganic pigment in an aqueous medium in a manner which disperses said inorganic pigment in said aqueous medium to form a stable aqueous dispersion of said inorganic pigment, and wherein the amount of said ethylenically unsaturated aromatic monomer is sufficient to reduce the water sensitivity of a dried coating of a latex paint comprised of said stable aqueous dispersion of said inorganic pigment. This invention also relates to an inorganic pigment dispersion comprising an inorganic pigment and a dispersing polymer as described above in an aqueous medium.

This invention also relates to latex paints comprising the inorganic pigment dispersion composition of this invention and to a method of coating a substrate comprising contacting a surface of a substrate with a composition comprising a latex paint binder and an inorganic pigment dispersion of this invention and drying said surface to form a film of said composition in contact with said surface. With respect to certain embodiments, this invention relates to a polymer produced by the process of polymerizing monomers consisting essentially of:

(i) an aromatic monomer having the formula $CH_2=C(R^1)(R^2)$ wherein $R^1$ is an aromatic group having from 6 to 10 carbon atoms, and $R^2$ is hydrogen or methyl, (ii) an acid monomer having the formula $CH_2=C(R^3)(C(O)OH)$ wherein $R^3$ is hydrogen or methyl, or mixtures thereof, and (iii) an amide monomer having the formula $CH_2=CR^4(C(O)NHA)$ wherein $R^4$ is hydrogen or methyl and A is hydrogen or methylol. Said polymer is typically produced by polymerization of the monomers while in an aqueous alcohol solution.

In typical embodiments, the monomers consist essentially of one or more of said aromatic monomers in an amount of from about 30% to about 60% by weight, and one or more of said acid monomers in an amount of from about 30% to about 60% by weight, and one or more of said amide monomers in an amount of from about 1% to about 30% by weight. The polymer typically has a molecular weight (e.g. weight average) of from about 1,000 to about 20,000.

Certain of the polymers of this invention can also be represented by the formula:

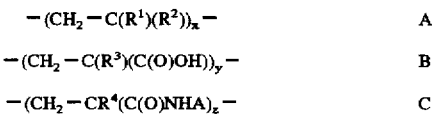

wherein R1 is an aromatic group having from 6 to 10 carbon atoms and $R^2$ and $R^3$ and $R^4$ are each independently, hydrogen or methyl, A is hydrogen or methylol, and y is sufficient to permit said polymer to associate with an inorganic pigment in an aqueous medium in a manner which disperses said inorganic pigment in said aqueous medium to form a stable aqueous dispersion of said inorganic pigment, and wherein x is sufficient to reduce the water sensitivity of a dried coating of a latex paint comprised of said stable aqueous dispersion of said inorganic pigment. The subscripts x, y, and z represent the mole ratios of the monomeric units. Thus, the subscripts will be integers for a monodisperse polymer composition and will be average values when expressed in relation to a poly-disperse polymer composition. Further, the formula is not intended to convey that the polymer is a block copolymer. Thus, both random and block copolymers are within the scope of the formula.

A preferred class of polymers within the scope of this invention have the formula set forth above wherein $R^1$ is phenyl, $R^2$, $R^3$, and $R^4$ are hydrogen, and the ratio of x:y:z is chosen such that the polymer is comprised of monomeric units of formula A in an amount from about 30% to about 60% by weight, monomeric units of formula B in an amount from about 30% to about 60% by weight, and monomeric units of formula C in an amount of about 1% to about 30% by weight, and the sum of x, y, and z is chosen such that the polymer has a molecular weight (e.g. weight average) of from about 1,000 to about 20,000.

DETAILED DESCRIPTION OF THE INVENTION

In certain aspects, this invention relates to novel polymers and to a method of making such polymers. In other aspects, this invention also relates to the use of the novel polymers to disperse an inorganic pigment in an aqueous medium and to the resulting dispersions. In still other aspects, this invention also relates to latex paint compositions comprised of a latex paint binder and an inorganic pigment dispersion of this invention and to a method of coating a substrate which employs such latex paint compositions. Each of these aspects will be addressed in turn below.

The polymers of this invention can be generally characterized as terpolymers, i.e. they have repeating units derived from at least three different monomers: an aromatic monomer, an acid monomer, and an amide monomer. Thus, the starting materials for preparing the novel polymers of this invention are ethylenically unsaturated aromatic compounds, ethylenically unsaturated acid compounds, and ethylenically unsaturated amide compounds.

The monomeric unit A is derived from an ethylenically unsaturated aromatic compound. Examples of the ethylenically unsaturated aromatic compounds include monovinyl aromatic hydrocarbons containing from 8 to 12 carbon atoms and halogenated derivatives thereof having halo-substituted aromatic moieties. Specific examples include styrene, alpha-methylstyrene, vinyl toluene (e.g. a 60/40 mixture by weight of meta-methylstyrene and para-methylstyrene), meta-methylstyrene, para-methylstyrene, para-ethylstyrene, para-n-propylstyrene, para-isopropylstyrene, para-tert-butylstyrene, ortho-chlorostyrene, para-chlorostyrene, alpha-methyl-meta-methylstyrene, alpha-methyl-para-methylstyrene, tert-butyl styrene, alpha-methyl-ortho-chlorostyrene, and alpha-methyl-para-chlorostyrene. Certain vinyl aromatic compounds are discussed in "Styrene Polymers", *Encyclopedia of Polymer Science and Engineering*, vol. 16, pp. 1–21 (John Wiley & Sons, Inc., N.Y., N.Y., 1989), the disclosure of which is incorporated by reference herein.

The monomeric unit B is derived from an ethylenically unsaturated acid monomer. Examples of alpha, beta-ethylenically unsaturated carboxylic acids which may also be useful as comonomers to prepare the polymer of the invention include acrylic acid, beta-acryloxypropionic acid and higher oligomers of acrylic acid and mixtures thereof, methacrylic acid, itaconic acid, aconitic acid, crotonic acid, citraconic acid, maleic acid, fumaric acid, alpha-chloroacrylic acid, cinnamic acid, mesaconic acid and mixtures thereof. Preferred examples are acrylic acid and methacrylic acid. Such acids are described in "Acrylic and Methacrylic Acid Polymers", *Encyclopedia of Polymer Science and Engineering*, vol. 1, pp. 211–234 (John Wiley & Sons, Inc., N.Y., N.Y., 1985), the disclosure of which is incorporated herein by reference.

Further examples of acid monomers that may be useful include the partial esters of unsaturated aliphatic dicarboxylic acids and particularly the alkyl half esters of such acids. Examples of such partial esters are the alkyl half esters of itaconic acid, fumaric acid and maleic acid wherein the alkyl group contains 1 to 6 carbon atoms. Representative members of this group of compounds include methyl acid itaconic, butyl acid itaconic, ethyl acid fumarate, butyl acid fumarate, and methyl acid maleate. These acid monomers generally have greater molecular bulk than the preferred monomer, acrylic acid, and thus, may have less hydrophilic character than the preferred monomer, acrylic acid. Thus, the use of such acid functional partial esters as the acid monomer may allow one to reduce the relative amount of aromatic monomer and yet obtain the same reduction in water sensitivity.

It is the acid groups of the B monomeric unit that are responsible for the ability of the polymer to associate with an inorganic pigment and, thus, stably disperse the inorganic pigment in an aqueous medium. The aromatic group of the A monomeric unit that is believed to be at least partially responsible for the reduced water sensitivity of a latex paint prepared from the inorganic pigment dispersion. The polymer should form a stable pigment dispersion, but also have reduced water sensitivity. Therefore, the amount of the A monomeric units should be sufficient to obtain the desired reduction in water sensitivity of a latex paint prepared therewith. Likewise, the amount of the B monomeric units should be sufficient to obtain the desired degree of stability of the pigment dispersion. It should also be noted that the amount of the C monomeric unit may also affect the water sensitivity of the paint coating for reasons more fully discussed below. The mode of such effect for the C monomeric unit is believed to differ from the mode of such effect for the A monomeric unit, which is believed to be based on the relative hydrophobicity of the aromatic group. Thus, when determining the amount of the A monomeric unit that is sufficient to reduce the water sensitivity of the polymer, the effect of the C monomeric unit should be considered, and if possible discounted in the analysis of the results, to obtain a valid comparison.

In general, the polymer should contain greater than 10% by weight of A monomeric units, preferably more than 25%. The amount of the A monomeric unit will, however, generally be a minor amount, e.g. from about 35% to about 50% by weight of the polymer, preferably from about 40% to about 45%. The amount of the B monomeric unit will typically be from about 35% to about 55% by weight of the polymer, more typically from about 40% to about 50%. However, the precise characteristics desired of the aqueous pigment dispersion and the latex paint prepared therefrom will influence the determination of what is an optimal amount of the A and B monomeric units, the precise identity of each monomer and the amount of each monomer affecting, as discussed herein, properties of the polymer which are important to its utility as an inorganic pigment dispersant.

The monomeric unit C is derived from an ethylenically unsaturated amide monomer. Examples of amides of alpha, beta-ethylenically unsaturated carboxylic acids which may also be useful as comonomers to prepare the polymers of the invention include acrylamide, N-methyl acrylamide, N,N-dimethyl acrylamide, methacrylamide, N-methyl methacrylamide, N,N-dimethyl methacrylamide, N-methylol acrylamide, N-methylol methacrylamide, N-(t-butoxy-methyl) acrylamide, N-(t-butoxy-methyl) methacrylamide, and mixtures thereof. Preferred examples are acrylamide and N-methylol acrylamide. The C monomeric unit will typically comprise from about 5% to about 25% by weight of the polymer, more typically from about 10 to about 20% by weight.

The C monomeric unit is thought to be at least partially responsible for a reduction in water sensitivity of the paint film. Without wishing to be bound by any particular theory, unless expressly noted otherwise in context, it is thought that the C monomeric unit engages in hydrogen bonding (e.g. when the monomer is a simple amide) and/or covalent bonding (e.g. when the monomer is an N-methylol amide) with the substrate and/or other components of the paint film, e.g. the binder resin. Further, this hydrogen bonding or covalent bonding is thought to cause the dispersing polymer to more strongly associate with the substrate or other component of the film and, thus, reduce the tendency of the dispersing polymer and the associated pigment particle to be solvated while in the dried paint film.

Because this mode of effecting the water sensitivity of the film is different from the mode believed for the A monomeric unit, the two determinations should be considered separately. In this regard, it can be understood that because the effect of the C monomeric unit relates to the interaction of the C monomeric unit with the substrate and/or other components of the paint film, it is likely that the effect of the C monomeric unit will, at least in some instances, depend on the identity of the substrate and/or other component of the paint film. For example, if a given substrate or paint film is more susceptible to hydrogen or covalent bonding than another substrate or paint film (e.g. a paper substrate as opposed to a polyolefin substrate), the effect of the C monomeric unit will be more pronounced. Because the mode of effect of the A monomeric unit is believed to depend on the hydrophobic nature of the aromatic group, that effect is much less likely to be influenced by factors such as the identity of the substrate or other components of the paint film.

While the preferred dispersing polymers, based on styrene as the aromatic monomer, acrylic acid and/or methacrylic acid as the acid monomer and acrylamide or N-methylol acrylamide, are prepared without additional comonomers, other monoethylenically unsaturated polymerizable monomers useful in minor proportion (e.g. less than 10% by weight of the total monomer composition) as comonomers with the aromatic and acid monomers may be useful in preparing the polymers of this invention. Examples of other monomers include the vinylidene halides, vinyl halides, acrylonitrile, methacrylonitrile, vinyl esters such as vinyl formate, vinyl acetate and vinyl propionate, and mixtures of ethylene and such vinyl esters, acrylic and methacrylic acid esters of alcohol ethers such as diethylene glycol monoethyl or monobutyl ether methacrylate, $C_1$–$C_{10}$ alkyl esters of beta-acryloxypropionic acid and higher oligomers of acrylic acid, mixtures of ethylene and other alkylolefins such as propylene, butylene, pentene and the like, vinyl ethers such as methyl vinyl ether, ethyl vinyl ether, vinyl 2-methoxyethyl ether, vinyl 2-chloroethyl ether and the like, hydroxy functional vinyl monomers such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, and 2-hydroxypropyl methacrylate.

In addition to mono-ethylenically unsaturated monomers, the monomers from which the polymer is prepared may also be comprised of an ethylenically unsaturated monomer having at least two sites of ethylenic unsaturation, i.e. a di- or higher multi-ethylenically unsaturated monomer. Examples of multiethylenic monomers include alkenyl acrylates or methacrylates (e.g. allyl methacrylate), di-alkenyl arenes, particularly di-alkenyl benzenes (e.g. divinyl benzene), di-alkenyl ethers (e.g. ethylene glycol di-allyl ether and pentaerythritol di-allyl ether), di-acrylamides (e.g. methylene-bis-acrylamide, trimethylene-bis-acrylamide, hexamethylene-bis-acrylamide, N,N'diacryloylpiperazine, m-phenylene-bis-acrylamide, and p-phenylene-bisacrylamide), di- or higher multi-acrylates (e.g. diethylene glycol diacrylate, propylene glycol dimethacrylate, ethylene glycol dimethacrylate, polyethylene glycol diacrylate, bis(4-acryloxypolyethoxyphenyl)-propane, 1,3-butylene glycol dimethacrylate, 1,5-pentanediol diacrylate, neopentyl glycol diacrylate, 1,6-hexanediol diacrylate, and polypropylene glycol diacrylate, pentaerythritol triacrylate, trimethylolpropane triacrylate, trimethylolpropane trimethacrylate, pentaerythritol tetraacrylate, triethylene glycol, and dimethacrylate). Such multifunctional monomers may be useful as crosslinking agents to modifying the molecular weight of the polymer and improve the paint film's water resistant properties. The amount of the multiethylenic monomers will be a minor amount, typically from about 0.1% to about 3% by weight of total monomers, because the polymer should not be so highly crosslinked that it is rendered insoluble.

While it is thus conceivable that the polymer will contain monomeric units derived from monomers other than the aromatic monomer and the acid monomer, in preferred embodiments, the polymer is prepared by solution polymerization of monomers consisting of:

(a) from about 30% to about 60%, preferably from about 35% to about 50%, by weight based on the total weight of monomers, of an ethylenically unsaturated aromatic monomer having less than twelve carbon atoms, preferably styrene, (b) from about 30% to about 60%, preferably from about 35% to about 55%, by weight based on the total weight of monomers, of an ethylenically unsaturated carboxylic acid having less than six carbon atoms, preferably acrylic acid and/or methacrylic acid, and (c) from about 1% to about 30%, preferably from about 5% to about 25%, by weight based on the total weight of monomers of an amide having less than nine carbon atoms of an ethylenically unsaturated carboxylic acid having less than six carbon atoms, preferably acrylamide and/or N-methylol acrylamide.

In general, the polymer will have a molecular weight (e.g. weight average) of from about 1,000 to about 20,000, typically from about 1,500 to about 10,000, and more typically from about 2,000 to about 6,000. The acid value (expressed as mg of KOH per gram of polymer) of the polymer should be greater than about 240, typically greater than 250, more typically from about 300 to about 500, and even more typically from about 395 to about 425. These typical acid values are based on polymers in which acrylic acid is the acid monomer and the acid value of other polymers, given the same mole ratio of acid monomer to other monomers will depend, of course, on the molecular weight of the particular acid monomer used.

In the polymerization process of this invention, the monomers are dissolved in a solvent consisting essentially of a major amount by weight of a water-miscible organic solvent having chain transfer activity and a minor amount by weight of water. The monomers are then polymerized in said solution.

The solvent of this invention has two components. It is an aqueous solvent in that one of the components is water. The other component is an organic solvent that must meet two criteria. First, the organic solvent must be miscible with water in the proportion in which the water is present in the solvent system. It should be noted that the identity and amounts of the monomers in the solution may affect the miscibility of the organic solvent and the water. Thus, the organic solvent must not only be miscible with water, but miscible with the resulting solution as a whole. Accordingly, by "water-miscible" it is meant that the organic solvent will not form a discrete second liquid phase in the reaction medium.

The organic solvent must also have chain transfer activity. Chain transfer is discussed in "Chain Transfer", *Encyclopedia of Polymer Science and Engineering*, vol. 3. pp. 288–290 (John Wiley & Sons, Inc., N.Y., N.Y., 1985), the disclosure of which is incorporated herein by reference. Chain transfer refers to the termination of a growing polymer chain and the start of a new one by a chain transfer agent. The chain transfer coefficients of solvents are available in the literature, e.g. J. Brandrup and E. H. Immergut, *Polymer Handbook*, (2d ed. John Wiley & Sons, Inc., N.Y., N.Y., 1975), the disclosure of which is incorporated herein by reference. Typically, the organic solvent will be an oxygenated hydrocarbon, for example an alcohol, ketone (e.g. acetone), or ester (e.g. ethyl acetate), typically having no more than about six (preferably no more than about three) carbon atoms per oxygen atom. Typically, the organic solvent will be a lower alkanol, e.g. a $C_1$–$C_6$, more typically a $C_2$–$C_4$ alkanol, e.g. isobutanol. The preferred organic solvent is isopropanol.

The relative amounts of the organic solvent and water in the solvent system must be selected so that the monomers dissolved therein remain miscible with the solution during the course of the polymerization reaction. Typically, the organic solvent will be present in a major amount (i.e. more than 50% by weight) and the water will be present in a minor amount by weight. The weight ratio of organic solvent to water will typically be from about 1.5:1 to 8:1, more typically from about 2:1 to about 6:1, and even more typically from about 2.5:1 to about 3.5:1.

The polymerization process may be a thermal or redox type; that is, free radicals may be generated solely by the thermal dissociation of an initiator species or a redox system may be used. A polymerization initiator of the free radical type, such as ammonium or potassium persulfate, may be used alone or as the oxidizing component of a redox system, which also includes a reducing component such as potassium metabisulfite, sodium thiosulfate or sodium formaldehyde sulfoxylate. The reducing component is frequently referred to as an accelerator. The initiator and accelerator, commonly referred to as catalyst, catalyst system or redox system, are typically used in proportion from about 0.01% to 10% or less each, based on the weight of monomers to be copolymerized. Examples of redox catalyst systems include t-butyl hydroperoxide/sodium formaldehyde sulfoxylate/Fe (II), and ammonium persulfate/sodium bisulfite/sodium hydrosulfite/Fe(II). The polymerization temperature may be from room temperature to 90° C. (with isobutanol) or 80° C. (with isopropanol), or more if the reaction zone is pressurized to maintain the solvent as a liquid, and may be optimized for the catalyst system employed, as is conventional. The temperature of the reaction vessel during the polymerization may be controlled by cooling to remove heat generated by the polymerization reaction or by heating the reaction vessel.

Additional chain transfer agents including mercaptans, polymercaptans and polyhalogen compounds may also be desirable in the polymerization mixture to moderate polymer molecular weight. Examples of chain transfer agents which may be used include long chain alkyl mercaptans such as t-dodecyl mercaptans, alcohols such as isopropanol, isobutanol, lauryl alcohol or t-octyl alcohol, carbon tetrachloride, tetrachloroethylene and trichlorobromoethane. Generally from about 0.001 to 3% by weight of an additional chain transfer agent, based on the weight of the monomer mixture, may be used.

To minimize the tendency of the acid monomer to separate into a second aqueous phase, the pH of the solvent system will typically be adjusted to retain at least a portion, and preferably most, of the acid monomer in the free acid form. Thus, the pH of the solvent system will be on the acid side of neutral, e.g. from about 2 to about 4.

Inorganic Pigment Dispersions

In one aspect, this invention relates to a method of preparing a pigment dispersion useful in the preparation of latex paints. The method in its broadest conception comprises dispersing a pigment in an aqueous medium further comprised of a dispersing polymer, said aqueous medium being essentially free of volatile organic solvents. While the acid monomer which forms part of the dispersing polymer will typically be in the free acid form during the solution polymerization, the aqueous medium in which the inorganic pigment is to be dispersed will typically have a neutral, or even alkaline, pH such that the monomeric unit derived from the acid monomer will typically be in the form of a charged anion, e.g. carboxylate.

The dispersing polymers of this invention form the pigment dispersions of this invention when dissolved in an aqueous solvent containing ammonia or an organic amine. The polymer is added to the solvent typically in an amount of about 30–40% polymer solids based on the weight of the solvent. Typically, the aqueous solvent will contain only ammonia to avoid any contribution to the volatile organic content of the pigment dispersion, but examples of suitable organic amines that can be used in place of or with ammonia include primary, secondary, and tertiary amines which can act as a base to salt polymer. Specific examples of organic amines are the dialkyl aminoalkanols such as 2-(N,N-dimethylamino)ethanol and 2-(N,N-diethylamino)ethanol.

The ammonia or organic amine is present in the aqueous solution in an amount sufficient to solubilize the dispersing polymer. In general, the ammonia or organic amine will be present in the aqueous solution in an amount sufficient to theoretically neutralize the acid groups of the polymer, i.e., the amount of ammonia or organic amine is stoichiometrically equivalent to or greater than the acid value of the polymer. A large excess of organic amine should be avoided because retention of the organic amine in the dried paint coating may adversely affect the water resistance of the coating.

The amount of the acid monomer used to prepare the dispersing polymer should be sufficient in relation to the amount of the aromatic monomer to yield a polymer that is sufficiently capable of associating with the inorganic pigment such that a stable pigment dispersion is formed. If the polymer is not sufficiently capable of associating with the inorganic pigment, observable precipitation of the pigment during the intended shelf life of the pigment dispersion or the latex paint prepared therewith may occur.

The pigment dispersion is typically made by first dissolving the dispersing polymer in water. The dispersion will typically be essentially free of organic solvents, e.g. alcohol solvents such as the short chain aliphatic alcohols having from 2 to 4 carbon atoms, e.g. the lower alkanols, ethanol, n-propanol, isopropanol and n-butanol. These solvents can contribute to the volatile organic content (a.k.a. VOC) of the dispersion and any paint prepared therefrom, which has environmental disadvantages.

One of the ingredients of the pigment dispersions of this invention is an inorganic pigment or colorant. The generic term pigment includes both colorant pigments and opacifying pigments. The term "colorant pigment" is specifically used in this specification to refer to both pigments and dyes which impart a distinct color (i.e. a hue as opposed to white (the absence of color) or black and/or shades of gray) to the composition.

The pigment of the dispersion may be a colorant pigment, i.e. the pigment will impart a color to the pigment dispersion, to a printing ink prepared therefrom, and to the surface of a substrate printed with such a printing ink. The colorant pigments useful in this invention will typically include black, inorganic red, inorganic yellow, as well as violet, orange, green, and brown. Useful pigments include for instance ferrite yellow oxide, red iron oxides, ferric iron oxide brown (which is a blend of red, yellow, and black iron oxides), tan oxide (which is a similar blend), raw sienna and burnt sienna, raw and burnt umber, carbon black, lampblack.

The inorganic pigment will typically, however, be an opacifying pigment. For purposes of this invention, white opacifying pigments are not considered to be colorant pigments. Opacifying pigments are generally pigments having a refractive index of at least about 1.8. Typical white opacifying pigments include rutile and anatase titanium dioxide. The dispersions can further contain non-opacifying filler or extender pigments often referred to in the art as inerts and include clays, such as kaolinite clays, silica, talc, mica, barytes, calcium carbonate, and other conventional filler pigments. All filler or extender pigments have fairly low refractive indices and can be described generally as pigment other than opacifying pigment.

The pigment dispersions of this invention may be prepared as follows. The pigment is mixed with an aqueous solution of the dispersing polymer and, at a properly adjusted viscosity, dispersed thereinto with ball mill, sand mill, high-shear fluid flow mill, Cowles Dissolver, Katy Mill or the like. The process of dispersing causes agglomerates of the pigment particles to deagglomerate and the dispersing polymer causes the deagglomerated particles of pigment to be wetted with the aqueous solution. This wetting thus inhibits the reagglomeration of the pigment particles.

The pigment dispersion will typically be characterized as a slurry of the pigment in an aqueous medium which also contains a minor amount of the dispersing polymer. Typically, the weight ratio of inorganic pigment to aqueous medium is from about 1:1 to about 10:1, more typically from about 1.5:1 to about 5:1, and even more typically from about 2:1 to about 4:1. The weight ratio of inorganic pigment to dispersing polymer on a solid basis is typically from about 10:1 to about 1000:1, more typically from about 50:1 to about 500:1, and even more typically from about 75:1 to about 150:1.

Latex Paint Compositions

The invention includes latex paint compositions containing an emulsion or dispersion of a water-insoluble polymer and a pigment dispersion of the invention. The water-insoluble polymers may be any of the types conventionally utilized in latex paint compositions and include natural rubber latex ingredients and synthetic latices wherein the water-insoluble polymer is an emulsion polymer of mono- or poly-ethylenically unsaturated olefinic, vinyl or acrylic monomer types, including homopolymers and copolymers of such monomers. Latices and latex paints are discussed extensively in "Latices", *Encyclopedia of Polymer Science and Engineering*, vol. 8, pp. 647–677 (John Wiley & Sons, Inc., N.Y., N.Y., 1987), and "Coatings", *Encyclopedia of Polymer Science and Engineering*, vol. 3, pp.615–675 (John Wiley & Sons, Inc., N.Y., N.Y., 1985), the disclosures of which are incorporated herein by reference.

Specifically, the water-insoluble emulsion polymer may include poly (vinyl acetate) and copolymers of vinyl acetate (preferably at least 50% by weight) with one or more of vinyl chloride, vinylidene chloride, styrene, vinyltoluene, acrylonitrile, methacrylonitrile, acrylamide, methacrylamide, maleic acid and esters thereof, or one or more of the acrylic and methacrylic acid esters mentioned in U.S. Pat. Nos. 2,795,564 and 3,356,627, which polymers are well-known as the film-forming component of aqueous base paints; homopolymers of $C_2$–$C_{40}$ alpha olefins such as ethylene, isobutylene, octene, nonene, and styrene, and the like; copolymers of one or more of these hydrocarbons with one or more esters, nitriles or amides of acrylic acid or of methacrylic acid or with vinyl esters, such as vinyl acetate and vinyl chloride, or with vinylidene chloride; and diene polymers, such as copolymers of butadiene with one or more of styrene, vinyl toluene, acrylonitrile, methacrylonitrile, and esters of acrylic acid or methacrylic acid. It is also quite common to include a small amount, such as 0.5 to 2.5% or more, of an acid monomer in the monomer mixture used for making the copolymers mentioned above by emulsion polymerization. Acids used include acrylic, methacrylic, itaconic, aconitic, citraconic, crotonic, maleic, fumaric, the dimer of methacrylic acid, and so on.

The vinyl acetate copolymers are well-known and include copolymers such as vinyl acetate/butyl acrylate/2-ethylhexyl acrylate, vinyl acetate/butyl maleate, vinyl acetate/ethylene, vinyl acetate/vinyl chloride/butyl acrylate and vinyl acetate/vinyl chloride/ethylene. Throughout this specification the term "acrylic polymer" means any polymer wherein at least 50% by weight is an acrylic or methacrylic acid or ester, including mixtures of such acids and esters individually and together. The term "vinyl acetate polymer" means any polymer containing at least 50% by weight of vinyl acetate.

The aqueous polymer dispersions may be prepared according to well-known procedures, using one or more emulsifiers of an anionic, cationic, or nonionic type. Mixtures of two or more emulsifiers regardless of type may be used, except that it is generally undesirable to mix a cationic with an anionic type in any appreciable amounts since they tend to neutralize each other. The amount of emulsifier may range from about 0.1 to 6% by weight or sometimes even more, based on the weight of the total monomer charge. When using a persulfate type of initiator, the addition of emulsifiers is often unnecessary. This omission or the use of only a small amount, e.g., less than about 0.5%, of emulsifier, may sometimes be desirable from a cost standpoint, and less sensitivity of the dried coating or impregnation to moisture, and hence less liability of the coated substrate to be affected by moisture. In general, the molecular weight of these emulsion polymers is high, e.g., from about 100,000 to 10,000,000 viscosity average, most commonly above 500,000.

The foregoing and other emulsion polymer systems which may be pigmented with the pigment dispersions of the invention are set forth in the extensive literature on the subject, such as U.S. Pat. Nos. 3,035,004; 2,795,564; 2,875,166; and 3,037,952, for example.

The pigment dispersion may be added to polymer latex systems at any time during the preparation thereof, including during or after polymerization or copolymerization and by single or multiple additions. Normally, from about 0.1% to about 10%, preferably 1–3%, by weight of pigment dispersion on polymer latex solids is adequate to provide suitable levels of pigmenting. However, the amount may be higher or lower depending on the particular system, other additives present, and similar reasons understood by the formulator.

This invention also relates to a method of coating a substrate comprising contacting a surface of a substrate with a composition comprising a latex paint binder and an inorganic pigment dispersion of this invention and drying said surface to form a film of said polymer in contact with said surface. Methods of coating substrates, e.g. roll coating and spray coating, are described in "Coating Methods", *Encyclopedia of Polymer Science and Engineering*, vol. 3, pp. 553–575 (John Wiley & Sons, Inc., N.Y., N.Y., 1985), the disclosure of which is incorporated herein by reference.

U.S. patent application Ser. No. (Case No. M5627 FPD/COAD), filed on even date herewith, relates to the use of copolymers of an aromatic monomer, e.g. styrene, and an acid monomer, e.g. acrylic acid, to disperse an inorganic pigment. It has been noted that a terpolymer of this invention has less of a tendency to contribute to the formation of foam in the pigment dispersion than the copolymers of copending U.S. patent application Ser. No. (Case No. M5627), filed on even date herewith. U.S. patent application Ser. No. (Case No. M5549 FPD/COAD), filed on even date herewith, relates to the use of terpolymers of two different aromatic monomers, e.g. styrene and alpha-methyl styrene, and an acid monomer, e.g. acrylic acid, to disperse an inorganic pigment. The disclosures of these applications are incorporated herein by reference.

The following examples will serve to further illustrate the invention, but should not be construed to limit the invention, unless expressly set forth in the appended claims. All parts, percentages, and ratios are by weight unless otherwise indicated in context.

EXAMPLES

POLYMER PREPARATION

EXAMPLE 1

(40% STYRENE/40% ACRYLIC ACID/20% ACRYLAMIDE TERPOLYMER)

In a 0.5 liter round bottom reaction flask equipped with a thermometer, condenser, stirrer, nitrogen inlet, and several other addition inlets, were charged 171.4 grams of isopropanol and 6.1 grams of deionized water. A nitrogen sweep was started and the contents of the reaction flask were heated to 80° C. To a 60 ml syringe attached to a micro delivery pump, was charged 50.3 grams of a 17.5% ammonium persulfate solution (initiator feed). To a 150 ml dropping addition flask, was charged a solution containing 35.2 grams of styrene, 35.2 grams of acrylic acid, 33.7 grams of 52.3% acrylamide solution, 0.1 grams tetrasodium salt of ethylene diamine tetraacetic acid, and 20.0 grams of isopropanol (monomer feed). After the contents of the reaction flask reached 80° C., the initiator feed and monomer feed were started at a rate such that the feeds would be complete in about 2 hours. During the delivery of the initiator solution and monomer solution, the reaction temperature was maintained at about 80° C. The reaction temperature was maintained for an additional hour after all feeds were finished. The contents of the reaction flask were cooled to 60° C. and then 74.5 grams of 29% ammonia solution was added. The reaction mass was heated to reflux, to a maximum of 100° C., and 276.5 grams of an isopropanol-water azeotrope was removed while simultaneously adding 273.9 grams of diluting water. The diluting water was added at the same rate the azeotrope was removed. The reactor contents were cooled to 25° C. before discharging and the pH of the polymer solution was adjusted to 7.6 with 29% ammonia solution. The resulting copolymer solution was a clear yellow liquid with a Brookfield viscosity of 73.0 cps (spindle #2 at 60 rpm at 25° C.), solids of 24.0%, and a pH of 7.6.

EXAMPLE 2

(45% STYRENE/45% ACRYLIC ACID/10% ACRYLAMIDE TERPOLYMER)

Into a 0.5 liter round bottom reaction flask equipped with a thermometer, condenser, stirrer, nitrogen inlet, and several other addition inlets, were charged 186.4 grams of isopropanol and 14.3 grams of deionized water. A nitrogen sweep was started and the contents of the reaction flask were heated to 80° C. To a 60 ml syringe attached to a micro delivery pump, was charged 50.3 grams of a 17.5% ammonium persulfate solution (initiator feed). To a 150 ml dropping addition flask, was charged a solution containing 39.6 grams of styrene, 39.6 grams of acrylic acid, 16.8 grams of 52.3% acrylamide solution, 0.1 grams tetrasodium salt of ethylene diamine tetraacetic acid, and 5.0 grams of isopropanol (monomer feed). After the contents of the reaction flask reached 80° C., the initiator feed and monomer feed were started at a rate such that the feeds would be complete in about 2 hours. During the delivery of the initiator solution and monomer solution, the reaction temperature was maintained at about 80° C. The reaction temperature was maintained for an additional hour after all feeds were finished. The contents of the reaction flask were cooled to 60° C. and then 83.8 grams of 29% ammonia solution was added. The reaction mass was heated to reflux, to a maximum of 100° C., and 277.6 grams of an isopropanol-water azeotrope was removed while simultaneously adding 269.0 grams of diluting water. The diluting water was added at the same rate the azeotrope was removed. The reactor contents were cooled to 25° C. before discharging and the pH of the polymer solution was adjusted to 7.6 with 29% ammonia solution. The resulting copolymer solution was a clear yellow liquid with a Brookfield viscosity of 61.0 cps (spindle #2 at 60 rpm at 25° C.), solids of 25.6%, and a pH of 7.6.

EXAMPLE 3

(40% STYRENE/50% ACRYLIC ACID/10% N-METHYLOL ACRYLAMIDE TERPOLYMER)

Into a 0.5 liter round bottom reaction flask equipped with a thermometer, condenser, stirrer, nitrogen inlet, and several other addition inlets, were charged 186.4 grams of isopropanol and 12.8 grams of deionized water. A nitrogen sweep was started and the contents of the reaction flask were heated to 80° C. To a 60 ml syringe attached to a micro delivery pump, was charged 50.3 grams of a 17.5% ammonium persulfate solution (initiator feed). To a 150 ml dropping addition flask, was charged a solution containing 35.2 grams of styrene, 44.0 grams of acrylic acid, 18.3 grams of 48% n-methylolacrylamide solution, and 5.0 grams of isopropanol (monomer feed). After the contents of the reaction flask reached 80° C., the initiator feed and monomer feed were started at a rate such that the feeds would be complete in about 2 hours. During the delivery of the initiator solution and monomer solution, the reaction temperature was maintained at about 80° C. The reaction temperature was maintained for an additional hour after all feeds were finished. The contents of the reaction flask were cooled to 60° C. and then 93.0 grams of 29% ammonia solution was added. The reaction mass was heated to reflux, to a maximum of 100° C., and 271.0 grams of an isopropanol-water azeotrope was removed while simultaneously adding 263.2 grams of diluting water. The diluting water was added at the same rate the azeotrope was removed. The reactor contents were cooled to 25° C. before discharging and the pH of the polymer solution was adjusted to 7.3 with 29% ammonia solution. The resulting copolymer solution was a clear yellow liquid with a Brookfield viscosity of 73.0 cps (spindle #2 at 60 rpm at 25° C.), solids of 25.5%, and a pH of 7.3.

EXAMPLE 4

(40% STYRENE/40% ACRYLIC ACID/20% N-METHYLOL ACRYLAMIDE TERPOLYMER)

Into a 0.5 liter round bottom reaction flask equipped with a thermometer, condenser, stirrer, nitrogen inlet, and several other addition inlets, were charged 165.8 grams of isopropanol and 3.2 grams of deionized water. A nitrogen sweep was started and the contents of the reaction flask were heated to 80° C. To a 60 ml syringe attached to a micro delivery pump, was charged 50.3 grams of a 17.5% ammonium persulfate solution (initiator feed). To a 150 ml dropping addition flask, was charged a solution containing 35.2 grams of styrene, 35.2 grams of acrylic acid, 36.7 grams of 48% n-methylolacrylamide solution, and 25.6 grams of isopropanol (monomer feed). After the contents of the reaction flask reached 80° C., the initiator feed and monomer feed were started at a rate such that the feeds would be complete in about 2 hours. During the delivery of the initiator solution and monomer solution, the reaction temperature was maintained at about 80° C. The reaction temperature was maintained for an additional hour after all feeds were finished. The contents of the reaction flask were cooled to 60° C. and then 39.1 grams of 50% sodium hydroxide solution was added. The reaction mass was heated to reflux, to a maximum of 100° C., and 256.0 grams of an isopropanol-water azeotrope was removed while simultaneously adding 248.9 grams of diluting water. The diluting water was added at the same rate the azeotrope was removed. The reactor contents were cooled to 25° C. before discharging and the pH of the polymer solution was adjusted to 7.2 with 50% sodium hydroxide solution. The resulting copolymer solution was a clear yellow liquid with a Brookfield viscosity of 250 cps (spindle #2 at 60 rpm at 25° C.), solids of 29.9%, and a pH of 7.2.

COMPARATIVE EXAMPLE 1

(100% ACRYLIC ACID HOMOPOLYMER)

Polyacrylic acid in its neutralized form was used as the dispersing polymer.

COMPARATIVE EXAMPLE 2

(40% STYRENE/60% ACRYLIC ACID COPOLYMER)

Into a 0.5 liter round bottom reaction flask equipped with a thermometer, condenser, stirrer, nitrogen inlet, and several other addition inlets, were charged 168.2 grams of isopropanol and 56.1 grams of deionized water. A nitrogen sweep was started and the contents of the reaction flask were heated to 80° C. To a 60 ml syringe attached to a micro delivery pump, was charged 40.0 grams of a 5.0% ammonium persulfate solution (initiator feed). To a 150 ml dropping addition flask, was charged a solution containing 35.2 grams of styrene and 52.7 grams of methacrylic acid (monomer feed). After the contents of the reaction flask reached 80° C., the initiator feed and monomer feed were started at a rate such that the feeds would be complete in about 2 hours. During the delivery of the initiator solution and monomer solution, the reaction temperature was maintained at about 80° C. The reaction temperature was maintained for an additional two hours after all feeds were finished. Five ml of a 22% ammonium persulfate solution was added and allowed to react with residual monomer for one hour. Then 195.5 grams of 29% ammonia solution was slowly added while simultaneously removing 240.0 grams of an isopropanol-water azeotrope at reflux to a maximum of 100° C. The ammonia was added at the same rate the azeotrope was removed. The reactor contents were cooled to 25° C. before discharging and the pH of the polymer solution was adjusted to 10.0 with 29% ammonia solution. The resulting copolymer solution was a clear yellow liquid with a Brookfield viscosity of 170 cps (spindle #2 at 60 rpm at 25° C.), solids of 30.5%, and a pH of 10.0. SEC molecular weight distribution was Mw of 9,003 and Mn of 1,468.

PIGMENT DISPERSION AND PAINT PREPARATION

An amount of dispersing polymer solution sufficient to yield 1% polymer solids per total pigment solids in the pigment dispersion was mixed with the following ingredients.

| Ingredients | Parts by Weight |
|---|---|
| Deionized water | 45.0 |
| Surfactant (Triton CF-10, Union Carbide) | 1.8 |
| Defoamer (Foamaster AP, Henkel) | 2.0 |
| Titanium dioxide pigment (TiPure R-900, DuPont) | 196.0 |

Grind above for 15–20 minutes using a high speed Dispermat CV Model D 5226. Fineness-of-Grind should be 6+, then add:

| | |
|---|---|
| Styrene acrylic latex binder (Rhoplex HG-74, Rohm & Haas) | 543.0 |
| Methyl carbitol (diethylene glycol methyl ether) | 45.0 |
| Texanol (2,2,4-trimethylpentanediol monoisobutyrate) | 34.8 |
| Defoamer (Foamaster AP) | 2.0 |
| Biocide(Dowicil 75 (20%), Dow Chemical) | 8.0 |

Adjust resulting mixture to pH of 8.3–8.5 by adding sufficient 28% aqueous ammonium hydroxide. To the resulting mixture add a pre-mix of 4.9 parts by weight of a urethane rheology modifier, available as DSX 1514, Henkel Corporation and 28.6 parts by weight of water. Then add 70.0 parts by weight of water to form a finished paint. Test paints are allowed to equilibrate 24 hours prior to testing.

Test paints are applied to aluminum Q-Panels having a mill finish 3003 (0.025"×3"×9" dimension). Paints are applied 6 mils wet using a wet film applicator. Coated panels are then allowed to air dry horizontally for 24 hours. After 24 hours of film dry time, the panels are placed (coated side facing inside the chamber) on the QCT Weatherometer. This test method is a modified version of ASTM D 4585 with an internal chamber temperature of 100° F. Panels are rated hourly for the first eight hours with the final rating taken at hour 24. ASTM D714 is used to rate both frequency and size of visible blisters. Prior to QCT testing, gloss values are taken using a BYK Gardner Micro TRI glossmeter.

PAINT FILM DATA

| Example | Paint Film Drying Time (Days) | Gloss (20°/ 60°) | Exposure Time (Hours) (ASTM-D-4582) | Film Quality After Exposure Time |
|---|---|---|---|---|
| 1 | 1 | 55/83 | 24 | no blisters |
| 2 | 1 | 57/84 | 24 | no blisters |
| 3 | 1 | 55/84 | 24 | no blisters |
| 4 | 1 | — | 24 | no blisters |
| Comp. 1 | 1 | 15/58 | 24 | severe blistering |
| Comp. 2 | 1 | 37/76 | 24 | dense blistering |

What is claimed is:

1. A polymer useful as an inorganic pigment dispersant, said polymer being derived from monomers consisting essentially of an ethylenically unsaturated aromatic monomer, an ethylenically unsaturated acid monomer, and at least about 1 wt. % of an ethylenically unsaturated amide monomer, wherein the amount of said ethylenically unsaturated acid monomer is at least about 30 wt. % which is sufficient to permit said polymer to associate with an inorganic pigment in an aqueous medium in a manner which disperses said inorganic pigment in said aqueous medium to form a stable aqueous dispersion of said inorganic pigment, and wherein the amount of said ethylenically unsaturated aromatic monomer is sufficient to reduce the water sensitivity of a dried coating of a latex paint comprised of said stable aqueous dispersion of said inorganic pigment.

2. A polymer as claimed in claim 1 wherein said aromatic monomer has the formula $CH_2=C(R^1)(R^2)$ wherein $R^1$ is an aromatic group having from 6 to 10 carbon atoms, and $R^2$ is hydrogen or methyl.

3. A polymer as claimed in claim 1 wherein said aromatic monomer is styrene.

4. A polymer as claimed in claim 1 wherein said acid monomer has the formula $CH_2=C(R^3)(C(O)OH)$ wherein $R^3$ is hydrogen or methyl.

5. A polymer as claimed in claim 4 wherein said acid monomer is a mixture of compounds wherein $R^3$ is hydrogen and compounds wherein $R^3$ is methyl.

6. A polymer as claimed in claim 1 wherein said acid monomer is acrylic acid.

7. A polymer as claimed in claim 1 wherein said amide monomer has the formula $CH_2=CR^4(C(O)NHA)$ wherein $R^4$ is hydrogen or methyl and A is hydrogen or methylol.

8. A polymer as claimed in claim 7 wherein $R^4$ is hydrogen.

9. A polymer useful as an inorganic pigment dispersant, said polymer being derived from monomers consisting essentially of an ethylenically unsaturated aromatic monomer, an ethylenically unsaturated acid monomer, and an ethylenically unsaturated amide monomer having the formula $CH_2=CR^4(C(O)NHA)$ wherein $R^4$ is hydrogen or methyl and A is methylol, wherein the amount of said ethylenically unsaturated acid monomer is sufficient to permit said polymer to associate with an inorganic pigment in an aqueous medium in a manner which disperses said inorganic pigment in said aqueous medium to form a stable aqueous dispersion of said inorganic pigment, and wherein the amount of said ethylenically unsaturated aromatic monomer is sufficient to reduce the water sensitivity of a dried coating of a latex paint comprised of said stable aqueous dispersion of said inorganic pigment.

10. A polymer as claimed in claim 7 wherein A is hydrogen.

11. A polymer as claimed in claim 1 wherein greater than 10% of said monomers by weight based on the total weight of monomers are said aromatic monomer.

12. A polymer as claimed in claim 1 wherein from about 35% to about 50% of said monomers by weight based on the total weight of monomers are said aromatic monomer.

13. A polymer as claimed in claim 1 wherein from about 40% to about 45% of said monomers by weight based on the total weight of monomers are said aromatic monomer.

14. A polymer as claimed in claim 1 wherein from about 30% to about 60% of said monomers by weight based on the total weight of monomers are said acid monomer.

15. A polymer as claimed in claim 1 wherein from about 35% to about 55% of said monomers by weight based on the total weight of monomers are said acid monomer.

16. A polymer as claimed in claim 1 wherein from about 40% to about 50% of said monomers by weight based on the total weight of monomers are said acid monomer.

17. A polymer as claimed in claim 1 wherein from about 1% to about 30% of said monomers by weight based on the total weight of monomers are said amide monomer.

18. A polymer as claimed in claim 1 wherein from about 5% to about 25% of said monomers by weight based on the total weight of monomers are said amide monomer.

19. A polymer as claimed in claim 1 wherein from about 10% to about 20% of said monomers by weight based on the total weight of monomers are said amide monomer.

20. A polymer as claimed in claim 1 wherein said polymer has a weight average molecular weight of from about 1,000 to about 20,000.

21. A polymer as claimed in claim 1 wherein said polymer has a weight average molecular weight of from about 1,500 to about 10,000.

22. A polymer as claimed in claim 1 wherein said polymer has a weight average molecular weight of from about 2,000 to about 6,000.

23. A polymer as claimed in claim 1 wherein said polymer has an acid value of greater than about 240.

24. A polymer as claimed in claim 1 wherein said polymer has an acid value of about 300 to about 500.

25. A polymer as claimed in claim 1 wherein said polymer has an acid value of from about 395 to about 425.

26. A polymer as claimed in claim 1 wherein said polymer has an acid value of greater than about 250.

27. A polymer as claimed in claim 1 wherein the sum of the weights of said aromatic monomer, said acid monomer and said amide monomer is at least 90% by weight of said monomers.

28. A polymer as claimed in claim 1 wherein said monomers consist of said aromatic monomer, said acid monomer and said amide monomer.

29. A polymer as claimed in claim 1 wherein said monomers further comprise a multiethylenic monomer.

30. A polymer as claimed in claim 29 wherein the amount of said multiethylenic monomer is from about 0.1% to about 3% by weight of said monomers.

31. A polymer useful as an inorganic pigment dispersant, said polymer being derived from monomers consisting essentially of:
  (i) from about 35% to about 50% by weight of an aromatic monomer having the formula $CH_2=C(R^1)(R^2)$ wherein $R^1$ is an aromatic group having from 6 to 10 carbon atoms, and $R^2$ is hydrogen or methyl,
  (ii) from about 35% to about 55% by weight an acid monomer having the formula $CH_2=C(R^3)(C(O)OH)$ wherein $R^3$ is hydrogen or methyl, or mixtures thereof, and
  (iii) from about 5% to about 25% by weight an amide monomer having the formula $CH_2=CR^4(C(O)NHA)$ wherein $R^4$ is hydrogen or methyl and A is hydrogen or methylol, said polymer having a weight average molecular weight of from about 1,500 to about 10,000.

32. A polymer useful as an inorganic pigment dispersant, said polymer being derived from monomers consisting of from about 40% to about 45% by weight of styrene, from about 40% to about 50% by weight of acrylic acid, and from about 10% to about 20% by weight of a member selected from the group consisting of acrylamide and N-methylolacrylamide, said polymer having a weight average molecular weight of from about 2,000 to about 6,000.

33. A method of preparing an inorganic pigment dispersion useful in the preparation of latex paints, said method comprising dispersing an inorganic pigment in an aqueous medium further comprised of a dispersing polymer, said dispersing polymer being derived from monomers consisting essentially of an ethylenically unsaturated aromatic monomer, an ethylenically unsaturated acid monomer, and at least about 1 wt. % of an ethylenically unsaturated amide monomer, wherein the amount of said ethylenically unsaturated acid monomer is at least about 30 wt. % which is sufficient to permit said polymer to associate with an inorganic pigment in an aqueous medium in a manner which disperses said inorganic pigment in said aqueous medium to form a stable aqueous dispersion of said inorganic pigment, and wherein the amount of said ethylenically unsaturated aromatic monomer is sufficient to reduce the water sensitivity of a dried coating of a latex paint comprised of said stable aqueous dispersion of said inorganic pigment.

34. A method as claimed in claim 33 wherein said aqueous medium is essentially free of volatile organic solvents.

35. A method as claimed in claim 33 wherein the weight ratio of said inorganic pigment to said aqueous medium is from about 1:1 to about 10:1.

36. A method as claimed in claim 33 wherein the weight ratio of said inorganic pigment to said aqueous medium is from about 1.5:1 to about 5:1.

37. A method as claimed in claim 33 wherein the weight ratio of said inorganic pigment to said aqueous medium is from about 2:1 to about 4:1.

38. A method as claimed in claim 33 wherein the weight ratio of said inorganic pigment to said dispersing polymer is from about 10:1 to about 1000:1.

39. A method as claimed in claim 33 wherein the weight ratio of said inorganic pigment to said dispersing polymer is from about 50:1 to about 500:1.

40. A method as claimed in claim 33 wherein the weight ratio of said inorganic pigment to said dispersing polymer is from about 75:1 to about 150:1.

41. A method as claimed in claim 33 wherein said inorganic pigment is a titanium dioxide pigment.

42. An inorganic pigment dispersion comprising, in an aqueous medium being essentially free of volatile organic solvents, an inorganic pigment and a dispersing polymer, said dispersing polymer being derived from monomers consisting essentially of an ethylenically unsaturated aromatic monomer, an ethylenically unsaturated acid monomer, and at least about 1 wt. % of an ethylenically unsaturated amide monomer, wherein the amount of said ethylenically unsaturated acid monomer is sufficient to permit said polymer to associate with an inorganic pigment in an aqueous medium in a manner which disperses said inorganic pigment in sale aqueous medium to form a stable aqueous dispersion of said inorganic pigment, and wherein the amount of said ethylenically unsaturated aromatic monomer is at least about 30 wt. % which is sufficient to reduce the water sensitivity of a dried coating of a latex paint comprised of said stable aqueous dispersion of said inorganic pigment.

43. A latex paint comprising a latex paint binder and inorganic pigment dispersion composition comprising, in an aqueous medium, an inorganic pigment and a dispersing polymer derived from monomers consisting essentially of an ethylenically unsaturated aromatic monomer, an ethylenically unsaturated acid monomer, and at least about 1 wt. % of an ethylenically unsaturated amide monomer, wherein the amount of said ethylenically unsaturated acid monomer is sufficient to permit said polymer to associate with an inorganic pigment in an aqueous medium in a manner which disperses said inorganic pigment in said aqueous medium to form a stable aqueous dispersion of said inorganic pigment, and wherein the amount of said ethylenically unsaturated aromatic monomer is at least about 30 wt. % which is sufficient to reduce the water sensitivity of a dried coating of a latex paint comprised of said stable aqueous dispersion of said inorganic pigment.

44. A method of coating a substrate comprising:
  contacting a surface of a substrate with a composition comprising a latex paint binder and an inorganic pigment dispersion comprising, in an aqueous medium, an inorganic pigment and a dispersing polymer derived from monomers consisting essentially of an ethylenically unsaturated aromatic monomer, an ethylenically unsaturated acid monomer, and at least about 1 wt. % of an ethylenically unsaturated amide monomer, wherein the amount of said ethylenically unsaturated acid monomer is sufficient to permit said polymer to associate with an inorganic pigment in an aqueous medium in a manner which disperses said inorganic pigment in said aqueous medium to form a stable aqueous dispersion of said inorganic pigment, and wherein the amount of said ethylenically unsaturated aromatic monomer is at least about 30 wt. % which is sufficient to reduce the water sensitivity of a dried coating of a latex paint comprised of said stable aqueous dispersion of said inorganic pigment, and drying said surface to form a film of said composition in contact with said surface.

45. A process of preparing a polymer useful as an inorganic pigment dispersant, said process comprising dissolving monomers consisting essentially of an ethylenically unsaturated aromatic monomer, an ethylenically unsaturated acid monomer, and at least about 1 wt. % based on monomer of an ethylenically unsaturated amide monomer in a solvent consisting essentially of a major amount by weight of a water-miscible organic solvent having chain transfer activity and a minor amount by weight of water and polymerizing said monomers in said solution, and wherein the amount of said ethylenically unsaturated aromatic monomer is at least about 30 wt. % based on monomer.

46. A process as claimed in claim 45 wherein said water-miscible organic solvent is an oxygenated hydrocarbon.

47. A process as claimed in claim 45 wherein said water-miscible organic solvent is selected from the group consisting of alcohols, ketones, and esters having no more than about six carbon atoms per oxygen atom.

48. A process as claimed in claim 45 wherein said water-miscible organic solvent is a lower alkanol.

49. A process as claimed in claim 45 wherein said water-miscible organic solvent is a $C_2$–$C_4$ alkanol.

50. A process as claimed in claim 45 wherein said water-miscible organic solvent is isopropanol.

51. A process as claimed in claim 45 wherein the relative amounts of said water-miscible organic solvent and water are such that the monomers dissolved therein remain miscible with the solution during the course of the polymerization reaction.

52. A process as claimed in claim 45 wherein said water-miscible organic solvent is present in an amount of greater than 50% by weight of said solvent.

53. A process as claimed in claim 45 wherein the weight ratio of said water-miscible organic solvent to water is from about 1.5:1 to 8:1.

54. A process as claimed in claim 45 wherein the weight ratio of said water-miscible organic solvent to water is from about 2:1 to about 6:1.

55. A process as claimed in claim 45 wherein the weight ratio of said water-miscible organic solvent to water is from about 2.5:1 to about 3.5:1.

56. A process as claimed in claim 45 wherein the pH of said solvent is effective to retain at least a portion of the acid monomer in the free acid form.

57. A process as claimed in claim 45 wherein the pH of said solvent is from about 2 to about 4.

* * * * *